H. W. PETERSON.
HOSE COUPLING.
APPLICATION FILED MAY 10, 1910.

992,050.

Patented May 9, 1911.

2 SHEETS—SHEET 1.

WITNESSES:
L. H. Schmidt.
Perry B. Turpin.

INVENTOR
HENRI W. PETERSON,
BY Munn & Co.
ATTORNEYS

H. W. PETERSON.
HOSE COUPLING.
APPLICATION FILED MAY 10, 1910.

992,050.

Patented May 9, 1911.

2 SHEETS—SHEET 2.

WITNESSES:
L. H. Schmidt.
Perry B. Turpin.

INVENTOR
HENRI W. PETERSON,
BY Munn & Co.
ATTORNEYS

UNITED STATES PATENT OFFICE.

HENRI WICTOR PETERSON, OF SEATTLE, WASHINGTON.

HOSE-COUPLING.

992,050.  Specification of Letters Patent.  Patented May 9, 1911.

Application filed May 10, 1910. Serial No. 560,498.

*To all whom it may concern:*

Be it known that I, HENRI W. PETERSON, a citizen of Finland, Russia, and a resident of Seattle, in the county of King and State of Washington, have invented certain new and useful Improvements in Hose-Couplings, of which the following is a specification.

This invention is an improvement in hose and pipe connections and has for an object to provide a novel construction in which one of the coupling members will be provided with a packing arranged to be actuated by the pressure of the fluid within the coupled pipes in such manner as to render the pipe joint perfectly tight; and the invention consists in certain novel constructions, and combinations of parts as will be hereinafter described and claimed.

Figure 1:
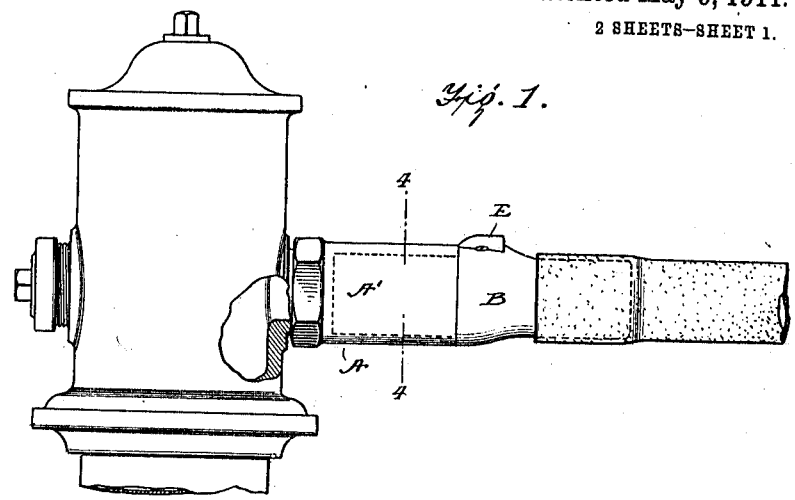
Figure 2:
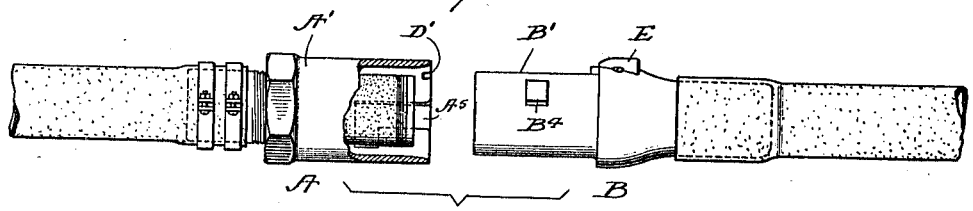
Figure 3:
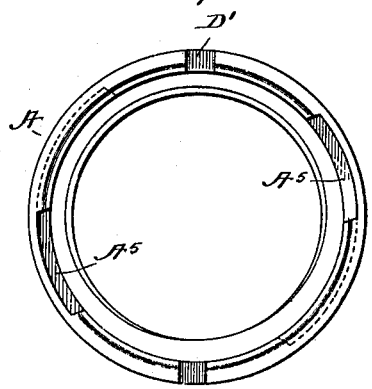
Figure 4:
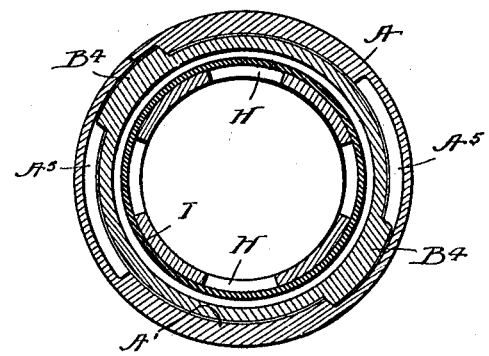
Figure 5:
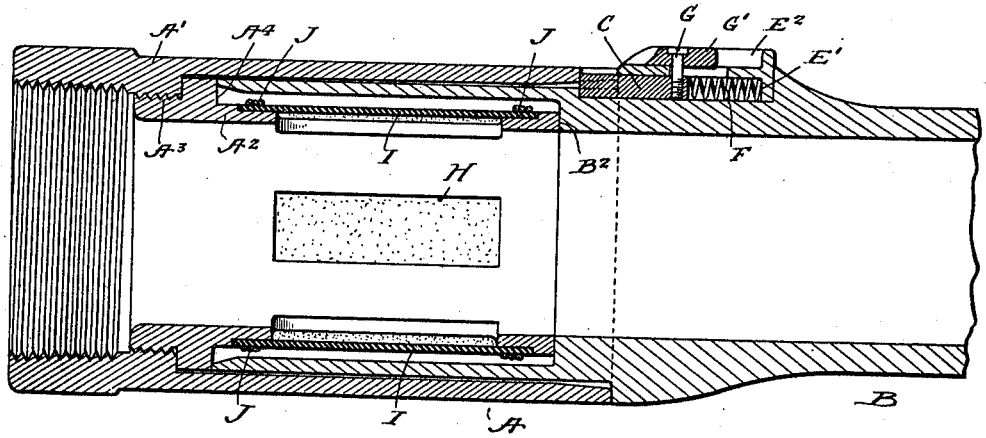
Figure 6:
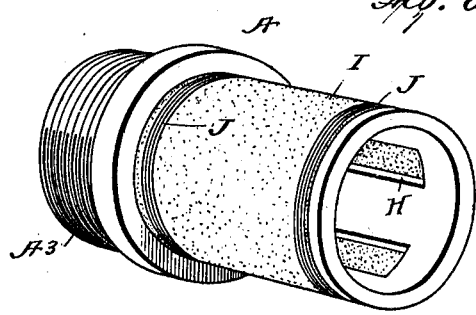
Figure 7:
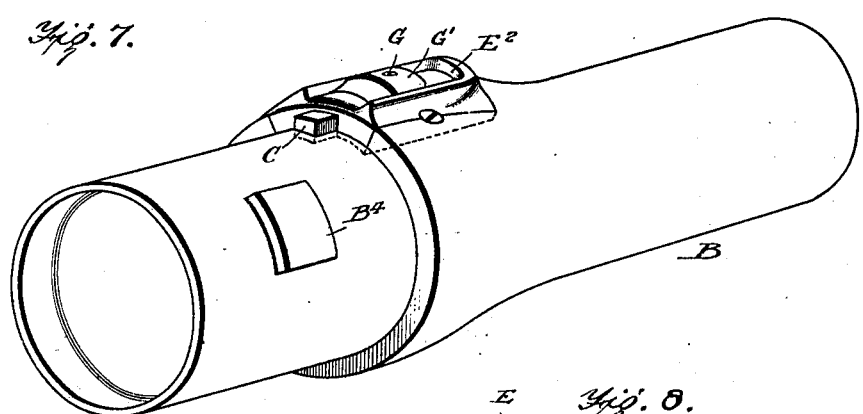
Figure 8:
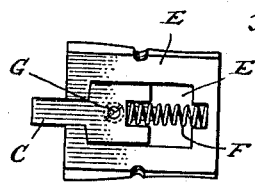

In the drawings Figure 1 is a side view showing the invention embodied in a coupling with a hydrant. Fig. 2 is a top plan view, partly in section, showing the coupling embodied in a hose coupling. Fig. 3 is a detail end view of the socket member of the coupling. Fig. 4 is a cross section on about line 4—4 of Fig. 1. Fig. 5 is a longitudinal section of the connection. Fig. 6 is a detail perspective view of the inner section of the socket member. Fig. 7 is a detail perspective view of the nipple member of the coupling. Fig. 8 is a view of the inner side of the latch and its holder.

In the construction shown, the connection is formed by what, for convenience of reference, I term the socket member A and the nipple member B, the same being adapted to be united by a bayonet joint in the manner presently described. As shown, the socket member A comprises an outer sleeve or main section $A'$ and an inner sleeve or tube $A^2$ which is spaced apart from the outer section $A'$ and when made separate therefrom may be threaded into connection with the section $A'$ at $A^3$ as best shown in Fig. 5 of the drawing.

The section $A^2$ is spaced at its outer side from the inner side of the section $A'$ and forms an annular recess within which the tubular portion $B'$ of the nipple member fits when the parts are coupled, as shown in Fig. 5 of the drawings, the section $A^2$ having on its outer side near its inner end a shoulder at $A^4$ which forms a stop for abutment by the end of the nipple $B'$ for limiting the inward movement of the said part, the said nipple $B'$ having an internal shoulder at $B^2$ which is abutted by the end of the section $A^2$ when the parts are coupled.

The nipple $B'$ has on its outer side lugs $B^4$ which, operating in grooves $A^5$ in the inner face of the section $A'$ of the socket member, form a bayonet joint when the parts are coupled as shown in Fig. 5 and when the parts slip together in coupled position, as shown in Fig. 5, a latch C carried by the nipple member enters a notch D in the end of the section $A'$ and locks the parts in coupled position. This latch C is carried by a block E which is recessed in its underside at $E'$ to receive the body of the latch C and the spring F by which the latch is pressed normally to locked position as shown in Fig. 5 and a screw G projects outwardly from the latch C and secures at its outer end a handle portion $G'$ operating in a recess $E^2$ in the upper side of the block E by which the latch C can be conveniently released when desired.

When the parts are pushed longitudinally into coupled position, the latch C will be forced back automatically and then as the lugs $B^4$ are moved into the lateral wings of the grooves $A^5$ by a partial rotary movement of the sections A and B, the latch C when it comes opposite the notch D will enter the same and hold the parts from accidental detachment.

The inner section $A^2$ is provided with an opening or openings H preferably in series, as best shown in Fig. 4, and over these openings is fitted a cylindrical packing tube I preferably of rubber or other elastic substance which may be secured at its ends by wires J or any other suitable manner and will be forced out by the pressure within the coupled tubes or pipes in such manner as to pack against the inner side of the nipple section $B'$ when pressure is on, thus sealing the joint by the pressure within the pipes.

The invention may be utilized in coupling air, water or other fluid bearing pipes and is such as to permit the convenient connection and disconnection of the pipes whether it be applied in connection with a hydrant, as shown in Fig. 1 or in coupling two pipes or hose, as shown in Fig. 2. By making the section $A^2$ separate from the section $A'$ and screwing it in place, it can be conveniently removed and replaced whenever desired thus facilitating the replacing of the packing I whenever desired.

I claim:

A coupler comprising a socket member having an outer tubular section and an inner tubular section, the latter being threaded into connection with the outer section and having formed through it an opening and provided over the said opening with a cylindrical packing tube held at its ends, such inner section being spaced apart from the outer section to permit the introduction of a meeting tube and the outer section being provided on its inner side with grooves to coöperate in forming a bayonet joint and the said outer section being provided in its free end with a notch for the reception of a latch and a nipple section having a nipple adapted to be inserted between the inner and outer sections of the socket member and provided on said nipple with lugs to enter the grooves in the outer section of the socket member, and a latch on the nipple section adapted to enter the notch in the end of the socket member when the members are coupled, all substantially as and for the purposes set forth.

HENRI WICTOR PETERSON.

Witnesses:
ALEL J. OBERG,
CARL MATTAN.

---

Copies of this patent may be obtained for five cents each, by addressing the "Commissioner of Patents. Washington, D. C."